United States Patent
Chou et al.

(10) Patent No.: US 8,294,785 B2
(45) Date of Patent: Oct. 23, 2012

(54) METHOD FOR ADJUSTING PHOTOSENSITIVENESS OF DIGITAL CAMERA

(75) Inventors: Chan-Min Chou, Taipei County (TW); Tsung-Pin Lu, Taipei County (TW)

(73) Assignee: Altek Corporation, Hsinchu (TW)

(*) Notice: Subject to any disclaimer, the term of this patent is extended or adjusted under 35 U.S.C. 154(b) by 356 days.

(21) Appl. No.: 12/829,911

(22) Filed: Jul. 2, 2010

(65) Prior Publication Data

US 2012/0002081 A1    Jan. 5, 2012

(51) Int. Cl.
*H04N 5/235* (2006.01)
*H04N 5/222* (2006.01)

(52) U.S. Cl. .................... 348/230.1; 348/371

(58) Field of Classification Search ............. 348/229.1, 348/230.1, 370, 371
See application file for complete search history.

(56) References Cited

U.S. PATENT DOCUMENTS

| | | | |
|---|---|---|---|
| 7,164,446 B2 * | 1/2007 | Konishi | 348/349 |
| 7,522,210 B2 * | 4/2009 | Shimada | 348/364 |
| 7,706,674 B2 * | 4/2010 | Sugimoto et al. | 396/61 |
| 7,751,701 B2 * | 7/2010 | Endo | 396/123 |
| 7,924,343 B2 * | 4/2011 | Uchida | 348/370 |
| 7,973,830 B2 * | 7/2011 | Okamoto | 348/229.1 |
| 8,103,159 B2 * | 1/2012 | Lin et al. | 396/164 |
| 2005/0157206 A1 * | 7/2005 | Kato | 348/370 |
| 2008/0008361 A1 * | 1/2008 | Nozaki et al. | 382/118 |

FOREIGN PATENT DOCUMENTS

JP  2007025558 A *  2/2007
JP  2008092175 A *  4/2008

* cited by examiner

*Primary Examiner* — John Villecco
(74) *Attorney, Agent, or Firm* — Morris Manning & Martin LLP; Tim Tingkang Xia, Esq.

(57) ABSTRACT

A method for adjusting photosensitiveness is able to determine a relative distance of an object in an image capture area through images captured before and after pre-flash of a flash lamp, so that the relative distance serves as a reference for adjusting current photosensitiveness of the digital camera, thereby capturing an image having better quality in a status that the flash lamp provides a fill light.

10 Claims, 5 Drawing Sheets

METHOD FOR ADJUSTING PHOTOSENSITIVENESS OF DIGITAL CAMERA

BACKGROUND OF THE INVENTION

1. Field of Invention

The present invention relates to a method for adjusting photographing parameters of a digital camera, and more particularly, to a method for adjusting photosensitiveness of a digital camera.

2. Related Art

With the development of digital cameras, photography is no longer expensive consumption. A user can photograph a wanted image at will to record a time or scene worth remembering.

When photographing, a user usually hopes that the photographed picture is clear. Therefore, when a target (which can be scenery, a person or an object) is photographed, a satisfactory picture can be photographed only when a focal length and brightness of the target are adjusted suitable.

With the advancement of science and technology, a digital camera usually provides a function of setting photographing parameters automatically. Generally speaking, the digital camera calculates suitable photographing parameters for a target.

Light quantity emitted by a flash lamp of a digital camera can be adjusted according to a distance between the digital camera and the target.

A relation between flash intensity of a flash lamp and a distance of a target and a value of an aperture coefficient can be represented by GN=f×L. The GN represents the flash intensity (that is, a guide number (GN)), the f is the aperture coefficient, and the L is the distance between the target and the digital camera. The GN is a magnitude of evaluating luminous intensity of the flash lamp and is a major basic index for representing performance of the flash lamp.

In a photograph area of the digital camera, usually a plurality of objects exists. Generally speaking, the digital camera uses one of the objects as a target. As the digital camera provides a fill light for the target when photographing, in the photographed image, compared to the target, an image of the object relatively farther away from the digital camera is blurred and/or has relatively dark brightness.

Therefore, a heretofore unaddressed need exists in the art to address the aforementioned deficiencies and inadequacies.

SUMMARY OF THE INVENTION

In one aspect, the present invention relates to a method for adjusting photosensitiveness of a digital camera.

The present invention relates to the method for adjusting photosensitiveness of digital camera, which is applicable in a digital camera. The digital camera comprises a flash lamp and a photographing module.

First, a live view image corresponding to a plurality of objects is captured by the photographing module. Subsequently, the flash lamp is enabled to emit pre-flash light and a pre-flash image corresponding to the objects is captured by the photographing module. Next, a reflection image is calculated through the live view image and the pre-flash image and appearance positions of the objects in the pre-flash image are judged according to reflection information of all position points in the reflection image. A recognition procedure is then performed according to the appearance positions, so as to find image information of the objects presented in the pre-flash image and it is determined whether the objects are at more than two different depths of field (DOFs) according to the found image information of the objects.

When the objects are at more than two different DOFs, current photosensitiveness of the photographing module is adjusted. After the current photosensitiveness of the photographing module is adjusted, the flash lamp can emit pre-flash light again and the pre-flash image of the objects is captured with the photographing module again, so that the pre-flash image captured again serves as a reference for other photographing parameters.

When all the objects in front of the digital camera are at the same DOF, the current photosensitiveness of the photographing module is not adjusted and flash intensity of a main flash light is calculated through the pre-flash image.

Each object can be a face, and the recognition procedure can be a face recognition procedure.

Here, the reflection image is obtained through comparing brightness information of the live view image with brightness information of the pre-flash image.

For photosensitiveness adjustment, the photosensitiveness of the photographing module can be directly adjusted up to twice as much as the current photosensitiveness. Moreover, the adjustment can also be performed according to the setting options of photosensitiveness of the photographing module or specific objects.

The method for adjusting photosensitiveness of digital camera according to the present invention can determine the relative distance of the object in the image capture area through the images captured before and after pre-flash of the flash lamp, so that the relative distance serves as a reference for adjusting the current photosensitiveness of the digital camera, thereby capturing an image having better quality in a status that the flash lamp provides a fill light.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Here, a method for adjusting photosensitiveness of a digital camera according to the present invention can determine a relative distance of a object in an image capture area through images (a live view image and a pre-flash image) captured before and after pre-flash of a flash lamp, so that the relative distance serves as a reference for adjusting the current photosensitiveness of the digital camera, thereby capturing an image having better quality in a status that the flash lamp provides a fill light.

Figure 1:
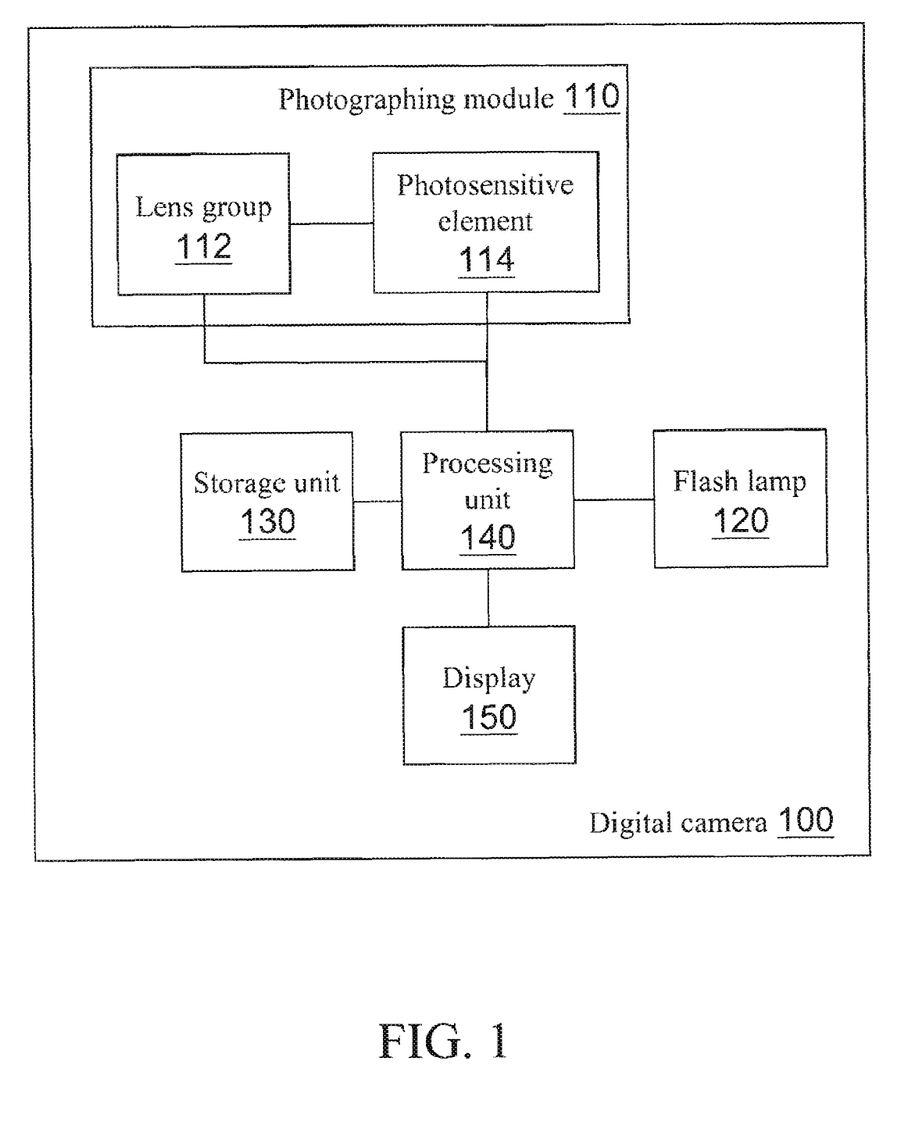
FIG. 1 is a general schematic view of a digital camera according to the present invention.

Referring to FIG. 1, a digital camera 100 comprises a photographing module 110, the flash lamp 120, a storage unit 130, a processing unit 140, and a display 150. The photographing module 110 comprises a lens group 112 and a photosensitive element 114.

The operation of the digital camera 100 can be divided into a live view stage, an auto focusing stage, a pre-flash stage, and a photograph stage.

The live view stage means a moment before a user press a shutter button of the digital camera 100. In the live view stage, the user can preview a viewfinder picture on the display 150 of the through digital camera 100.

The auto focusing stage means a moment when the user half-presses the shutter button of the digital camera 100. In the auto focusing stage, the digital camera 100 uses one or more objects among all the objects in the viewfinder picture as a target, an object distance between the lens group 112 and the target is adjusted, and the user can preview the viewfinder picture after focusing (that is, adjustment of the object distance is finished) through the display 150 of the digital camera 100.

The pre-flash stage means that the flash lamp 120 emits a pre-flash light after the focusing, and the digital camera 100 captures an image corresponding to the current viewfinder picture through the photographing module 110, so that the image serves as a reference for flash intensity in the photograph stage.

The photograph stage means that a moment that the user fully-presses the shutter button of the digital camera 100. In the photograph stage, the digital camera 100 photographs the current viewfinder picture through the photographing module 110 and records the photographed viewfinder picture as an image.

Here, the live view image means an image captured by the digital camera 100 in the live view stage or the auto focusing stage. The pre-flash image means an image captured by the digital camera 100 in the pre-flash stage.

The lens group 112 is used for adjusting a focal length for the photographed object.

The photosensitive element 114 is set corresponding to the lens group 112. The photosensitive element 114 can receive an optical signal corresponding to the target and surrounding sceneries of the target through the lens group 112, and obtain an image corresponding to the target according to an electric signal of a digital image converted from the received optical signal. The photosensitive element 114 can capture the live view image through the lens group 112 in the live view stage and auto focusing stage of the digital camera 100; capture the pre-flash image through the lens group 112 in the pre-flash stage of the digital camera 100; and capture the digital image through the lens group 112 in the photograph stage of the digital camera 100.

The processing unit 140 is electrically connected to the photosensitive element 114 and the storage unit 130. The processing unit 140 can control operations of the lens group 112 and photosensitive element 114. Also, the processing unit 140 can determine a distance of each object in front of the digital camera 100 according to the captured live view image and pre-flash image, so as to adjust the current photosensitiveness of the digital camera selectively.

In other words, the method for adjusting the photosensitiveness of digital camera according to the present invention can be implemented on the digital camera 100 through software or firmware program. That is to say, a program code for performing the method for adjusting the photosensitiveness of the digital camera according to the present invention can be stored in the storage unit 130 of the digital camera 10. The processing unit 140 of the digital camera 100 then reads and executes the stored program code, so as to enable the digital camera 100 to perform the method for adjusting the photosensitiveness of the digital camera according to the present invention to adjust the photosensitiveness of the digital camera 100 selectively.

The processing unit 140 can be implemented by one or a plurality of processors, such as a digital signal processor (DSP). The storage unit 130 can be implemented by one or a plurality of storages. The storage can be a non-volatile memory or a volatile memory.

Figure 2:
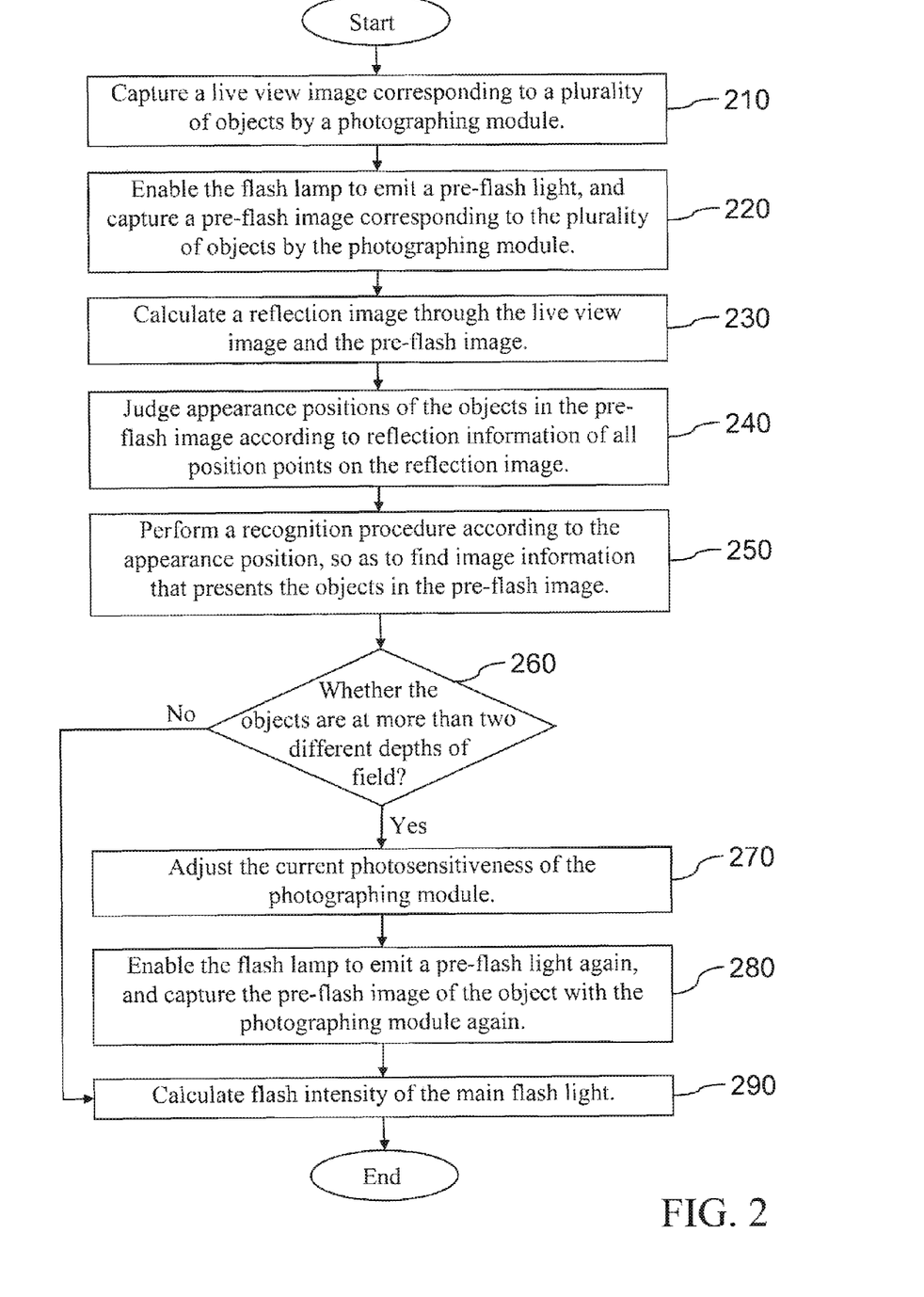
FIG. 2 is a flow chart of a method for adjusting photosensitiveness of digital camera according to an embodiment of the present invention.

FIG. 2 is a flow chart of a method for adjusting photosensitiveness of digital camera according to an embodiment of the present invention.

Referring to FIGS. 1 and 2, first, the live view image corresponding to the plurality of objects in front of the digital camera 100 is captured with the photographing module 110 (Step 210).

Subsequently, the flash lamp 120 is enabled to emit a pre-flash light, and a pre-flash image corresponding to the objects is captured with the photographing module 110 with the fill light of the pre-flash light (Step 220).

A reflection image is calculated through the captured live view image and pre-flash image (Step 230). Here, the reflection image can be obtained through comparing brightness information of the live view image with brightness information of the pre-flash image. In other words, the reflection image is corresponding to a difference between brightness information of the live view image and brightness information of the pre-flash image.

Appearance positions of the objects in the pre-flash image are judged according to reflection information of all position points on the reflection image (Step 240). That is to say, blocks that might belong to an image of the object in the pre-flash image can be judged through observation of reflection information of all position points on the reflection image. The reflection information can be a reflection quantity (that is, a difference value between brightness information at the same positions in the live view image and the pre-flash image) or a reflectivity. Each position point can be a pixel or an image block having a specific size.

A recognition procedure is performed according to the judged appearance position, so as to find image information that presents the objects in the pre-flash image (Step 250). In other words, object recognition is performed on a partial image at the appearance position of the pre-flash image through the recognition procedure, so as to find image blocks (that is, image information) that belong to the objects.

It is determined whether the objects are at more than two different depths of field (DOFs) according to the found image information of the objects (Step 260). Here, it can be learned whether the plurality of objects in front of the digital camera 100 falls at two different focus areas of the digital camera 100 through the calculated image information of the objects.

When the objects in front of the digital camera 100 are at two different DOFs, the current photosensitiveness of the photographing module 110 is adjusted (Step 270), so as to increase the brightness of an image of the object relatively farther away from the digital camera 100. That is to say, when the plurality of objects in front of the digital camera 100 falls at two different focus areas of the digital camera 100, the digital camera 100 adjusts the current photosensitiveness, so as to take the brightness of the objects that are relatively farther away from the digital camera 100 into consideration.

Also, after the current photosensitiveness of the photographing module 110 is adjusted, the flash lamp 120 can be enabled to emit pre-flash light again and the pre-flash image of the object is captured with the photographing module 110 again, so that the pre-flash image captured again serves as a reference for other photographing parameters (Step 280). For example, flash intensity of the main flash light can be calculated according to the obtained pre-flash image captured again (Step 290).

When all the objects in front of the digital camera 100 are at the same DOF, adjustment of the current photosensitiveness of the photographing module 110 is not performed and the flash intensity of the main flash light is calculated through the pre-flash image (Step 290).

During photographing, the flash lamp 120 is enabled to emit a main flash light having the calculated flash intensity, and a digital image of the objects is captured with the photographing module 110.

The object can be a face (i.e. human face). At this time, the recognition procedure is a face recognition procedure. However, the present invention is not limited thereto. The object can be set as a face, a building, an animal, a plant, a transportation tool, a label, and at least a feature item among specific objects according to practical demands.

Figure 3:
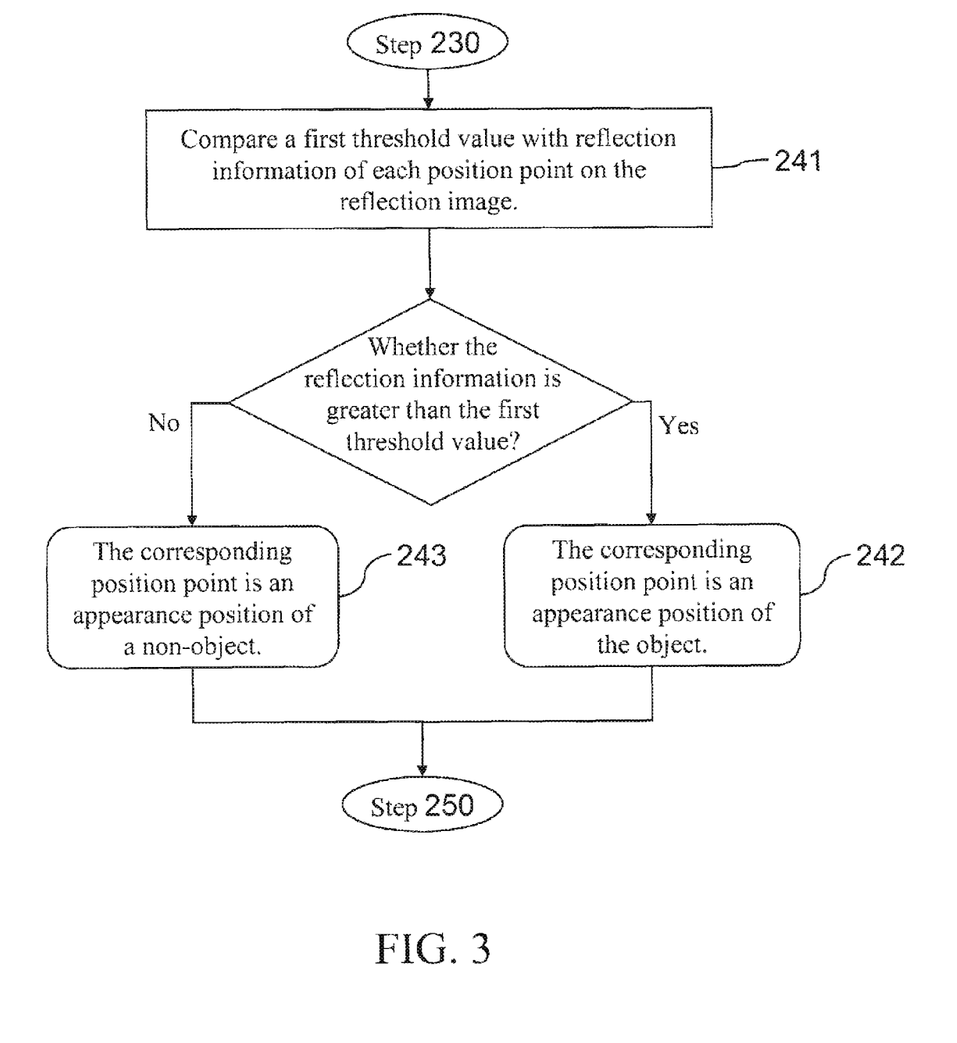
FIG. 3 is a detailed flow chart of Step 240 according to an embodiment of the present invention.

Referring to FIG. 3, in Step 240, a first threshold value can be compared with reflection information of each position point on the reflection image (Step 241).

When the reflection information is greater than the first threshold value, the corresponding position point (that is, the position point with the reflection information greater than the threshold value) is determined as an appearance position of the object (Step 242).

When the reflection information is smaller than or equal to the first threshold value, the corresponding position point (that is, the position point having the reflection information smaller than or equal to the threshold value) is determined as an appearance position of a non-object (Step 243).

Figure 4:
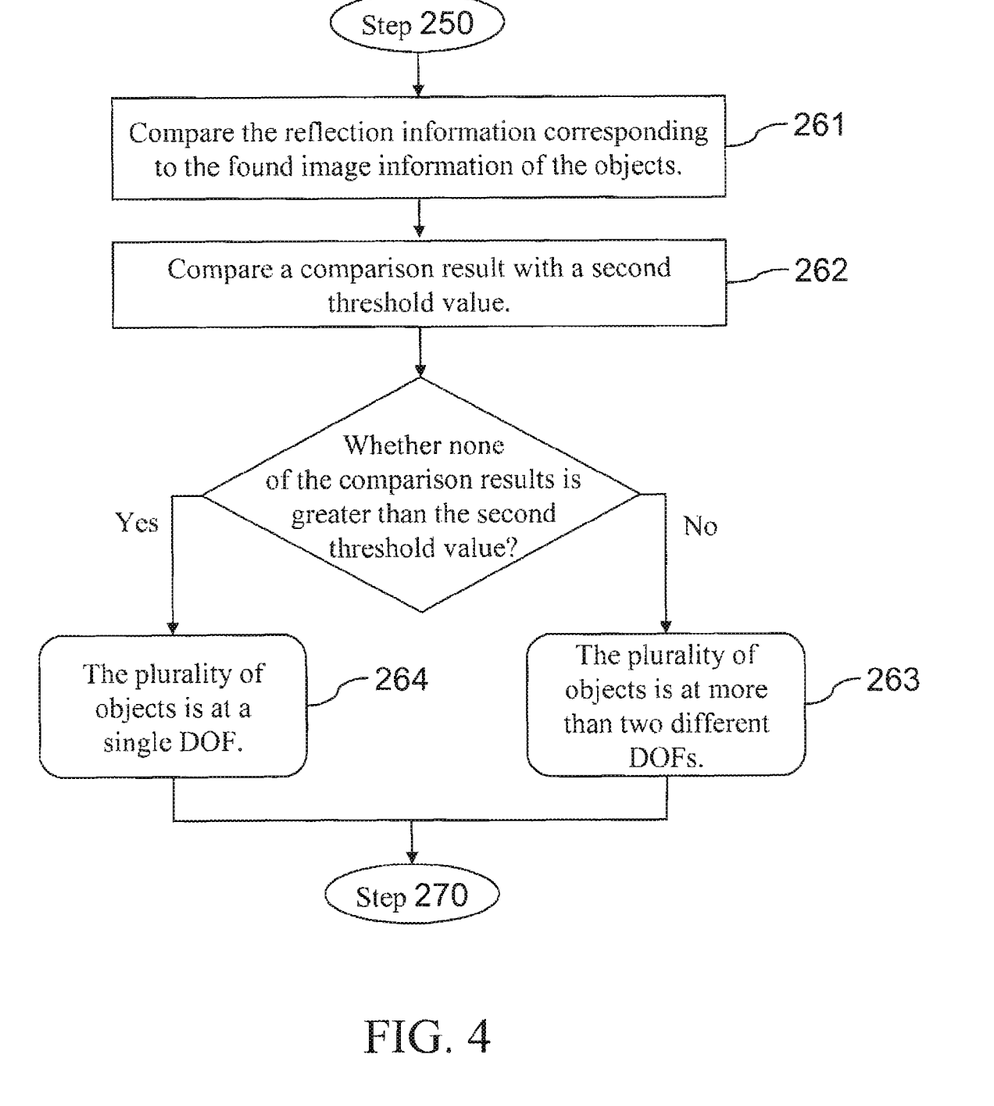
FIG. 4 is a detailed flow chart of Step 260 according to an embodiment of the present invention.

Referring to FIG. 4, in Step 260, the reflection information corresponding to the found image information of the objects can be compared with each other (Step 261) and a comparison result is compared with a second threshold value (Step 262). Here, the reflection information corresponding to image information of any two of the objects can be compared with each other, so as to obtain comparison results between every two of the objects. Alternatively, the reflection information corresponding to the image information of the object focused by the photographing module 110 is compared with the reflection information corresponding to the image information of other objects one by one.

When a difference between the reflection information corresponding to any two of the objects (that is, the comparison result) is greater than the second threshold value, it is determined that the plurality of objects in front of the digital camera 100 falls at more than two different DOFs (Step 263).

When the difference between the reflection information corresponding to every two of the objects (that is, the comparison result) is smaller than or equal to the second threshold value, it is determined that the plurality of objects in front of the digital camera 100 falls at a single DOF (Step 264).

Figure 5:
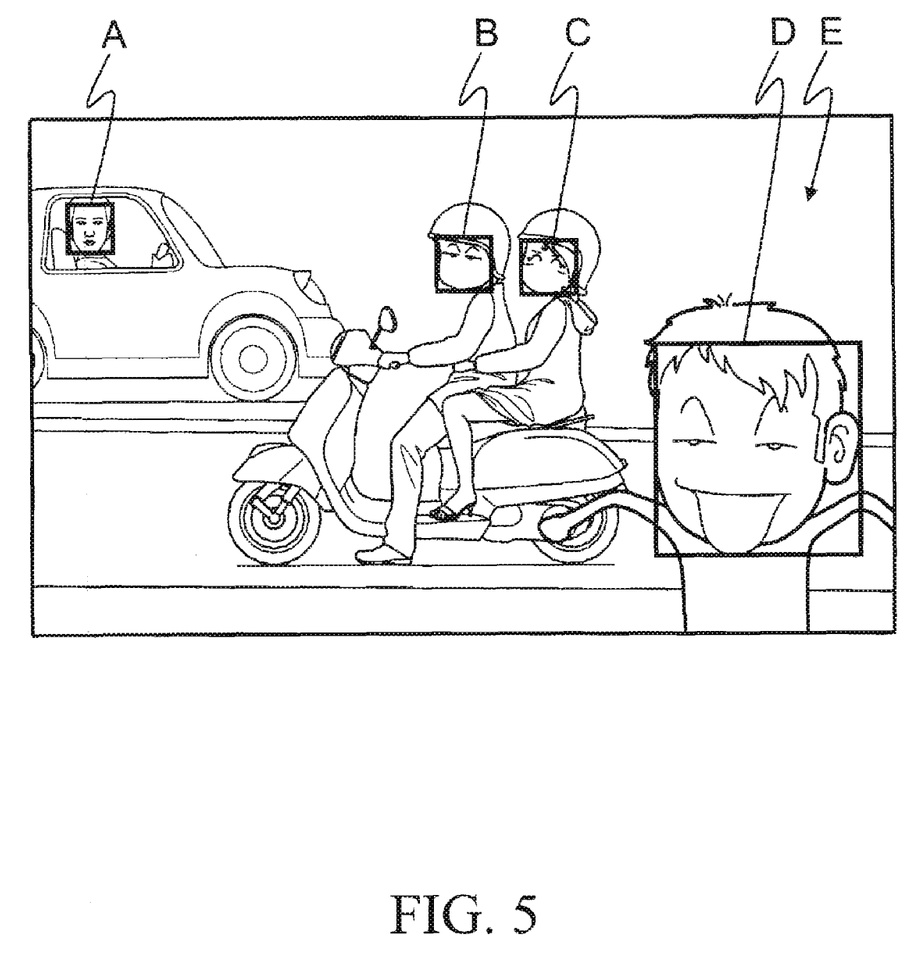
FIG. 5 is a schematic view of a viewfinder picture according to an embodiment of the present invention.

Here, an example that a face serves as an object is taken for illustration. Referring to FIG. 5, the image blocks A, B, C, and D in the image belong to four objects, respectively. The same image block A/B/C/D in the live view image and pre-flash image is at the same relative position.

Compared with an image block E that is not an object (for example, a background), a difference between the brightness information of the image block A/B/C/D of the object in the live view image and the brightness information of the same image block A/B/C/D in the pre-flash image is relatively larger. In other words, compared with the image block E that is not an object (for example, the background), for the same image block A/B/C/D, a difference between the brightness information in the live view image and the brightness information in the pre-flash image is relatively larger. Therefore, the reflection information of each position point in the reflection image is compared with the second threshold value, so as to obtain possible positions of the image blocks A, B, C, and D by finding the position points having the reflection information greater than the second threshold value. Further, the face recognition procedure is performed according to the found positions to determine the image blocks A, B, C, and D (that is, four faces).

Subsequently, the brightness information of the image blocks A, B, C, and D are compared, so as to determine whether the image blocks A, B, C, and D are at different DOFs.

For example, the brightness information of the image blocks A, B, C, and D can be compared one another, so as to obtain a difference value between the brightness information of the image blocks A and B, a difference value between the brightness information of the image blocks A and C, a difference value between the brightness information of the image blocks A and D, a difference value between the brightness information of the image blocks B and C, a difference value between the brightness information of the image blocks B and D, and a difference value between the brightness information of the image blocks C and D. The obtained six difference values are compared with the second threshold value to determine whether one of the difference values greater than the second threshold value exists. If one of the difference values greater than the second threshold value exists, it represents that the image blocks A, B, C, and D are at more than two different DOFs. Taking FIG. 5 as an example, the image blocks A, B, C, and D are at three different DOFs. That is to say, the image block A and the other three (the image blocks B, C, and D) are at different DOFs, and the image block D and the other three (the image blocks A, B, and C) are also at different DOFs.

In another embodiment, it is assumed that the digital camera 100 focuses on the object corresponding to the image block D, so that the brightness information of the image block D is compared with those of the other three (the image blocks A, B, and C), so as to obtain the difference value between the brightness information of the image blocks D and A, the difference value between the brightness information of the image blocks D and B, and the difference value between the brightness information of the image blocks D and C. The obtained three difference values are then compared with the second threshold value, so as to determine whether one of the difference values greater than the second threshold value exists. If one of the difference values greater than the second threshold value exists, it represents that the image blocks A, B, C, and D are at more than two different DOFs.

In Step 270, when it is determined that the objects in front of the digital camera 100 are at two different DOFs, the photosensitiveness of the photographing module 110 can be directly adjusted up to twice as much as the current photosensitiveness. Moreover, it can also be selected to perform adjustment according to the set options of the photosensitiveness of the photographing module 110 or specific objects.

As for the adjustment according to the set options of the photosensitiveness of the photographing module 110, when it is determined that the objects in front of the digital camera 100 are at two different DOFs, the current photosensitiveness can be increased by a level in sequence according to the setting options of the photosensitiveness of the photographing module 110. For example, it is assumed that the setting options of the photosensitiveness of the photographing module 110 provided by the digital camera 100 are 50, 100, 200, 400, 800, and 1600 and the current photosensitiveness is set as 100. When it is determined that the objects in front of the digital camera 100 are at two different DOFs, the photosensitiveness of the photographing module 110 is adjusted to 200 from 100.

As for the adjustment according to the specific objects, one or more objects among all the objects in front of the digital camera 100 can be selected to serve as a reference for calculating an adjustment value, so as to further adjust the current photosensitiveness of the photographing module 110 according to the calculated adjustment value.

The object has the greatest DOF can be selected as the reference for calculating the adjustment value, that is, the adjustment value of the photosensitiveness is calculated according to the image information of the object having the greatest DOF.

Alternatively, objects other than the target can be selected as the reference for calculating the adjustment value, that is, the adjustment value of the photosensitiveness is calculated according to the image information of one of the objects falls at a DOF other than the DOF focused by the photographing module 110. Here, the image information of an object at a DOF greater than the DOF of the target can be selected to calculate the adjustment value of the photosensitiveness. In the other words, the adjustment value of the photosensitiveness is calculated according to at least one of the objects, wherein the DOF of the object for calculating the adjustment value is selected among the DOFs of the objects other than the DOF focused by the photographing module.

As for the object as shown in FIG. 5, it is assumed that the object is a face and the digital camera 100 focuses on the object corresponding to the image block D. At this time, the image information of the image block A can be selected to calculate the adjustment value of the photosensitiveness, or the image information of one or two image blocks among the image blocks A, B, C are selected to calculate the adjustment value of the photosensitiveness.

In the description above, the "first" and "second" are only used for mark two elements (two threshold values) rather than limiting indication of specific elements or sequences.

What is claimed is:

1. A method for adjusting photosensitiveness of a digital camera, wherein the digital camera comprises a flash lamp and a photographing module, comprising:
    capturing a live view image corresponding to a plurality of objects by the photographing module;
    enabling the flash lamp to emit a pre-flash light, and capturing a pre-flash image corresponding to the objects by the photographing module;
    calculating a reflection image through the live view image and the pre-flash image;
    judging appearance positions of the objects in the pre-flash image through reflection information of all position points on the reflection image;
    performing a recognition procedure according to the appearance positions, so as to find image information that presents the objects in the pre-flash image;
    determining whether the objects are at more than two different depths of field (DOFs) according to the image information of the objects; and
    when the objects are at more than two different DOFs, adjusting current photosensitiveness of the photographing module.

2. The method for adjusting the photosensitiveness of the digital camera according to claim 1, wherein the objects are faces, and the recognition procedure is a face recognition procedure.

3. The method for adjusting the photosensitiveness of the digital camera according to claim 1, wherein the step of calculating a reflection image through the live view image and the pre-flash image comprises: obtaining the reflection image through comparing brightness information of the live view image with brightness information of the pre-flash image, and the reflection image is corresponding to a difference between brightness information of the live view image and brightness information of the pre-flash image.

4. The method for adjusting the photosensitiveness of the digital camera according to claim 1, wherein the step of judging appearance positions of the objects in the pre-flash image through reflection information of all the position points on the reflection image comprises:
    comparing the reflection information with a threshold value;
    when the reflection information is greater than the threshold value, determining the corresponding position point as the appearance position of the objects; and
    when the reflection information is smaller than or equal to the threshold value, determining that the corresponding position point is not the appearance position of the objects.

5. The method for adjusting the photosensitiveness of the digital camera according to claim 1, wherein the step of determining whether the objects are at more than two different DOFs according to the image information of the objects comprises:
    comparing the reflection information corresponding to the image information of the objects; and
    when a difference between the reflection information corresponding to two of the objects is greater than a threshold value, determining that the objects are at more than two different DOFs.

6. The method for adjusting the photosensitiveness of the digital camera according to claim 1, wherein the step of adjusting the current photosensitiveness of the photographing module comprises:
    increasing current photosensitiveness by a level in sequence according to the setting options of the photosensitiveness of the photographing module.

7. The method for adjusting the photosensitiveness of the digital camera according to claim 1, wherein the step of adjusting the current photosensitiveness of the photographing module comprises:
    adjusting the photosensitiveness of the photographing module twice as much as the current photosensitiveness.

8. The method for adjusting the photosensitiveness of the digital camera according to claim 1, wherein the step of adjusting the current photosensitiveness of the photographing module comprises:
    calculating an adjustment value of the photosensitiveness according to the image information of at least one object having the greatest DOF among the objects; and
    adjusting the current photosensitiveness of the photographing module according to the adjustment value.

9. The method for adjusting the photosensitiveness of the digital camera according to claim 1, wherein the step of adjusting the current photosensitiveness of the photographing module comprises:

calculating an adjustment value of the photosensitiveness according to at least one of the object, wherein the DOF of the object for calculating the adjustment value is selected among the DOFs of the objects other than the DOF focused by the photographing module; and adjusting the current photosensitiveness of the photographing module according to the adjustment value.

10. The method for adjusting the photosensitiveness of the digital camera according to claim 1, further comprising:

after the current photosensitiveness of the photographing module is adjusted, enabling the flash lamp to emit the pre-flash light again, and capturing the pre-flash image of the objects by the photographing module again.

* * * * *